United States Patent
Fukuyama et al.

(10) Patent No.: US 6,788,677 B1
(45) Date of Patent: Sep. 7, 2004

(54) GATEWAY APPARATUS, TERMINAL SPECIFICATION METHOD FOR GATEWAY APPARATUS AND COMPUTER-READABLE RECORDING MEDIUM HAVING RECORDED TERMINAL-SPECIFYING PROGRAM

(75) Inventors: Noriyuki Fukuyama, Kawasaki (JP); Masanobu Morinaga, Kawasaki (JP); Masahiro Matsuda, Kawasaki (JP); Kazuyuki Ohtsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/223,759

(22) Filed: Dec. 31, 1998

(30) Foreign Application Priority Data

Jun. 11, 1998 (JP) .......................................... 10-163437

(51) Int. Cl.[7] .............................................. H04L 12/66
(52) U.S. Cl. ................... 370/355; 370/270; 379/265.01
(58) Field of Search ................................ 370/351, 352, 370/355, 356, 400, 401, 402, 403, 404, 405, 406, 270, 261; 379/201.07, 201.08, 265.01, 265.02, 67.1, 219, 265.09, 90.02, 88.17, 211.01, 207.06, 373.02, 374.03, 204.01, 215.01

(56) References Cited

U.S. PATENT DOCUMENTS

| | | | | | |
|---|---|---|---|---|---|
| 5,329,578 | A | * | 7/1994 | Brennan et al. ........ 379/211.03 |
| 5,600,710 | A | * | 2/1997 | Weisser, Jr. et al. .......... 379/67 |
| 5,604,737 | A | | 2/1997 | Iwami et al. |
| 5,802,160 | A | * | 9/1998 | Kugell et al. .......... 379/211.04 |
| 5,828,666 | A | * | 10/1998 | Focsaneanu et al. ........ 370/389 |
| 5,857,017 | A | * | 1/1999 | Ohi et al. .................... 379/157 |
| 5,930,339 | A | * | 7/1999 | Nepustil .................. 379/88.26 |
| 5,936,952 | A | * | 8/1999 | Lecomte ...................... 370/352 |
| 6,038,293 | A | * | 3/2000 | McNerney et al. ...... 379/88.19 |
| 6,046,762 | A | * | 4/2000 | Sonesh et al. ................. 348/16 |
| 6,101,189 | A | * | 8/2000 | Tsuruoka ..................... 370/401 |
| 6,175,562 | B1 | * | 1/2001 | Cave ........................... 370/352 |
| 6,215,790 | B1 | * | 4/2001 | Voit et al. .................... 370/401 |
| 6,272,129 | B1 | * | 8/2001 | Dynarski et al. ............ 370/356 |
| 6,275,577 | B1 | * | 8/2001 | Jackson .................. 379/211.01 |
| 6,304,649 | B1 | * | 10/2001 | Lauzon et al. ......... 379/211.01 |
| 6,345,090 | B1 | * | 2/2002 | Walker et al. ......... 379/114.12 |

FOREIGN PATENT DOCUMENTS

| | | |
|---|---|---|
| JP | 7-170288 | 7/1995 |
| JP | 7-212494 | 8/1995 |
| JP | 8-111692 | 4/1996 |

* cited by examiner

*Primary Examiner*—Dang Ton
*Assistant Examiner*—Phuc Tran
(74) *Attorney, Agent, or Firm*—Staas & Halsey LLP

(57) ABSTRACT

A gateway apparatus connects a packet-switched network to a PSTN, the packet-switched network having a plurality of information terminals connected thereto. The gateway apparatus includes a recognition operation, an incoming call notification operation and a connection operation. The gateway operates (or is configured) to recognize information terminals on the packet-switched network. The incoming call notification operation notifies all the recognized information terminals of an incoming call upon reception of an incoming call from the PSTN. The connection operation connects the PSTN to an information terminal that has responded to the incoming call notification first. An incoming call notification may be sent to all or a plurality of the information terminals on the packet-switched network in a point-to-multipoint communication using a broadcast address or a multi-cast address. Source-identifying information and destination telephone numbers on the PSTN may be allotted to the information terminals in advance so that the destination of an incoming call notification can be specified. Additionally, a telephone message recorder terminal may be used to receive incoming calls when no other terminal responds to the incoming call.

21 Claims, 10 Drawing Sheets

SCHEMATIC DIAGRAM SHOWING CONFIGURATION OF EQUIPMENT

BLOCK DIAGRAM SHOWING CONFIGURATION

CLIENT MANAGEMENT TABLE

| No. | CLIENT NAME | IP ADDRESS |
|---|---|---|
| 000001 | Fujitsu01 | 123.456.789.001 |
| 000002 | Fujitsu02 | 123.456.789.002 |
| 000003 | Fujitsu03 | 123.456.789.003 |

GENERAL CALLING / RESPONSE DATA FORMAT

BLOCK DIAGRAM SHOWING CONFIGURATION

Fig. 7

CLIENT REGISTRATION TABLE

| No. | CLIENT NAME | IP ADDRESS | STATUS |
|---|---|---|---|
| 000001 | Fujitsu01 | 123.456.789.001 | COMMUNICATION AVAILABLE |
| 000002 | Fujitsu02 | 123.456.789.002 | COMMUNICATION UNAVAILABLE |
| 000003 | Fujitsu03 | 123.456.789.003 | COMMUNICATION AVAILABLE |

Fig. 8

CLIENT REGISTRATION TABLE

| No. | CLIENT NAME | SOURCE TELEPHONE NUMBER | IP ADDRESS |
|---|---|---|---|
| 000001 | Fujitsu01 | 06* | 123.456.789.001 |
| 000002 | Fujitsu02 | 03* | 123.456.789.002 |
| 000003 | Fujitsu03 | OTHER THAN ABOVE | 123.456.789.003 |

Fig. 9

CLIENT MANAGEMENT TABLE

| No. | CLIENT NAME | TELEPHONE NUMBER | IP ADDRESS |
|---|---|---|---|
| 000001 | Fujitsu01 | 012-345-1000 | 123.456.789.001 |
| 000002 | Fujitsu02 | 012-345-2000 | 123.456.789.002 |
| 000003 | Fujitsu03 | OTHER THAN ABOVE | 123.456.789.003 |

Fig. 11

CLIENT REGISTRATION TABLE ( CLAIM 8 )

| No. | CLIENT NAME | IP ADDRESS | SUPPLEMENT |
|---|---|---|---|
| 000000 | RUSUROKU | 123.456.789.001 | TELEPHONE MESSAGE RECORDER TERMINAL |
| | | | |
| | | | |

Fig. 12

CLIENT REGISTRATION TABLE

| No. | CLIENT NAME | IP ADDRESS | STATUS |
|---|---|---|---|
| 000000 | RUSUROKU | 123.456.789.001 | COMMUNICATION AVAILABLE |
| 000001 | Fujitsu01 | 123.456.789.002 | COMMUNICATION UNAVAILABLE |
| | | | |

GATEWAY APPARATUS, TERMINAL SPECIFICATION METHOD FOR GATEWAY APPARATUS AND COMPUTER-READABLE RECORDING MEDIUM HAVING RECORDED TERMINAL-SPECIFYING PROGRAM

BACKGROUND OF THE INVENTION

A. Field of the Invention

The present invention relates to a gateway apparatus that converts communication protocols between two networks having differing communication protocols. Specifically, the present invention relates to a gateway apparatus that effects communication between a circuit-switched network and a packet-switched network. The present invention further relates to a terminal specification method for such a gateway apparatus, and a computer-readable recording medium having recorded thereon a terminal-specifying program configured to operate such a gateway apparatus.

In the description below of present invention, the term "packet-switched network" refers generally to networks that use packet-switching in the transmission of data. Such packet-switched networks include, for instance, the Internet, Intranet and local area networks (LAN). Further, the term "information terminal" refers to a unit that can be connected to another unit on a packet-switched network and can transmit and receive packets to and from a gateway apparatus and connect and disconnect to and from the gateway apparatus in accordance with the present invention.

B. Description of the Related Art

The so-called "Internet telephone" is a voice communication service on the Internet and has recently gained popularity. In most cases at present, the Internet telephone system is operated in such a manner that each of communicating terminals has an Internet telephone protocol and is connected directly to the Internet. However, as the Internet telephone becomes more and more popular, attention is being paid increasingly to a gateway that connects a circuit-switched network to the Internet or the like. That is, the gateway provides a connection to permit communications between a client who is, e.g., a resident individual connected to a circuit-switched network such as a PSTN (Public Switched Telephone Network) and a client who is, e.g., a corporation directly connected to the Internet.

Some of the problems the present invention seeks to solve are discussed below.

To allow an incoming call from a circuit-switched network to arrive at a packet-switched network such as the Internet by using a conventional gateway, a client on the circuit-switched network must call the gateway once and then input the identifier (equivalent to the telephone number) of a client on the Internet again in accordance with a guidance or a dial tone.

SUMMARY OF THE INVENTION

An object of the present invention is to provide a gateway apparatus, a terminal specification method for the gateway apparatus and a computer-readable recording medium having recorded a terminal-specifying program, which facilitate the calling operation performed by a calling party on a circuit-switched network by specifying a client on a packet-switched network to which the calling operation is directed when the circuit-switched network and the packet-switched network are connected to each other.

In accordance with one aspect of the present invention, a gateway apparatus connects a packet-switched network to a circuit-switched network. The packet-switched network has a plurality of information terminals connected thereto. Such gateway apparatus includes recognition means, incoming call notification means and connection means. The recognition means recognizes information terminals on the packet-switched network. The incoming call notification means notifies all the recognized information terminals of a call when receiving an incoming call from the circuit-switched network. The connection means connects the circuit-switched network to the information terminal that responds first to the incoming call notification such that voice data of the incoming call is transmitted between the circuit-switched network and the information terminal via the gateway apparatus.

That is, when the gateway apparatus receives an incoming call from the circuit-switched network, the gateway apparatus notifies all the recognized information terminals of the call, and connects to the circuit-switched network the information terminal that has responded first to the call to establish the communication between the two. The calling party on the circuit-switched network can call an information terminal on the packet-switched network by inputting an identification number (e.g., telephone number) only once.

A second aspect of the present invention provides a gateway apparatus, in which the incoming call notification means notifies all the information terminals on the packet-switched network of a call in a point-to-multipoint communication manner using a broadcast address when receiving an incoming call from the circuit-switched network.

By using a broadcast address that designates all the information terminals on the packet-switched network as a destination or called IP address, the gateway apparatus notifies all the information terminals of an incoming call in a point-to-multipoint communication manner, and connects to the circuit-switched network an information terminal that has responded to the incoming call notification first. Thereby, voice data may be transmitted between the circuit-switched network and information terminals via the gateway apparatus.

A third aspect of the present invention provides a gateway apparatus, in which the incoming call notification means notifies a plurality of information terminals on the packet-switched network of a call in a point-to-multipoint communication manner using a multi-cast address when receiving an incoming call from the circuit-switched network.

By using a multi-cast address that specifies a plurality of information terminals among the information terminals on the packet-switched network as a destination address, the gateway apparatus notifies a plurality of information terminals of a call in a point-to-multipoint communication manner. The gateway apparatus thereafter connects to the circuit-switched network an information terminal having responded to the incoming call notification first.

A fourth aspect of the present invention provides a gateway apparatus, in which the recognition means allocates the order to each of the information terminals, and the incoming call notification means notifies each of the information terminals of a call in accordance with the order that has been allocated thereto when receiving an incoming call from the circuit-switched network, and continues to send the incoming call notification until a response to the incoming call notification is received.

For example, an appropriate order of notification, e.g., an alphabetical order of the names of the information terminals is specified, and the gateway apparatus notifies the information terminals of an incoming call in such specified order.

When an information terminal has responded to the incoming call notification, the gateway apparatus connects such information terminal to the circuit-switched network, and when the information terminal has not responded to the incoming call notification, the apparatus notifies an information terminal that is supposed to take its turn next of the call.

A fifth aspect of the present invention provides a gateway apparatus in which the recognition means allocates source-identifying information to each recognized information terminal. The source-identifying information provides a means for identifying a specific information terminal via, for instance, a portion of the telephone number provided from the circuit-switched network. The communication notification means selects an information terminal corresponding to identification from the source-identifying information. The communication notification means then notifies the selected information terminal of an incoming call when receiving an incoming call corresponding to the source-identifying information from the circuit-switched network.

The recognition means allots telephone numbers, or the like to the information terminals that it has recognized. When receiving an incoming call accompanying the telephone number (calling party number), the incoming call notification means selects an information terminal allotted to the telephone number from the recognized information terminals, and notifies the selected information terminal of an incoming call. For example, for incoming calls from a long-distance telephone number such as those numbers beginning with the digits "06", an incoming call notification is sent to information terminals A and B, and for other calls, an incoming call notification is sent to an information terminal C.

A sixth aspect of the present invention provides a gateway apparatus, in which: a gateway supports a plurality of lines on the circuit-switched network; and the recognition means allots any one of the plurality of lines to each of the recognized information terminals; and when receiving a call directed to one of the plurality of lines from the circuit-switched network, the incoming call notification means selects an information terminal allotted to the line to which the call is directed and notifies the selected information terminal of an incoming call.

For example, let us assume that the gateway apparatus supports two lines on circuit-switched network. The recognition means allots either one of the two lines to information terminals that it recognizes. The incoming call notification means sends an incoming call notification to an information terminal allotted to the line to which the call is directed.

A seventh aspect of the present invention provides a gateway apparatus, in which: the information terminals and the gateway apparatus can handle character communication with each other by using an application for executing character communications substantially on a real-time basis; the incoming call notification means notifies the recognized information terminals of an incoming call by means of character communication when receiving an incoming call from the circuit-switched network; and the connection means in the gateway apparatus connects the information terminal that responds first to the circuit-switched network.

An exemplary application for executing character communications is "Internet Relay Chat (IRC)." The incoming call notification means transmits an incoming call notification command, e.g., "SET UP" to a chat channel. On the other hand, a specific command, e.g., "CONNECT" indicating a willingness to connect, is inputted at an information terminal in response to an incoming call notification, the connection means detects the command "CONNECT" and connects the information terminal that has inputted such command to the circuit-switched network.

An eighth aspect of the present invention provides a gateway apparatus, in which: at least one of the information terminals is a telephone message recorder terminal having communication recording means and being always available; and the connection means in the gateway apparatus connects the telephone message recorder terminal to the circuit-switched network if there is no response from any one of the information terminals to which an incoming call notification has been sent such that voice data may be communicated therebetween by the gateway apparatus.

If none of the information terminals to which the incoming call notification is sent has responded, the connection is established between the telephone message recorder terminal and the circuit-switched network to make a recording of caller's message, images and the like.

A ninth aspect of the present invention provides a gateway apparatus, in which the recognition means recognizes available information terminals.

The recognition means stores information terminals that are available by providing, e.g., a client management list. The incoming call notification means notifies the information terminals stored in the client management list of an incoming call, so that wasteful incoming call notifications addressed to unavailable information terminals can be eliminated.

A tenth aspect of the present invention provides a gateway apparatus, in which: the recognition means maintains available status of the recognized information terminals; and the incoming call notification means notifies information terminals whose status is such that they are available for receiving an incoming call.

For example, all the information terminals on the packet-switched network are stored in the client management list or the like, and the status of each information terminal, whether it is available or not, is updated and stored in accordance with a notification from each information terminal. The incoming call notification means and the connection means notifies an available information terminal of an incoming call and establishes the communication.

An eleventh aspect of the present invention provides a terminal specification method used for a gateway apparatus that connects a packet-switched network to a circuit-switched network, the packet-switched network having a plurality of information terminals connected thereto. The method includes the steps of: recognizing information terminals on the packet-switched network; notifying the recognized information terminals of an incoming call when an incoming call is received from the circuit-switched network; and connecting to the circuit-switched network the information terminal that has responded first to the incoming call notification.

This aspect of the invention has an operation similar to that of the first aspect of the invention.

A twelfth aspect of the present invention provides a computer-readable recording medium having recorded a terminal-specifying program used for a gateway that connects a packet-switched network to a circuit-switched network, the packet-switched network having a plurality of information terminals connected thereto. The recording medium has recorded the terminal-specifying program that executes the following steps A, B and C.

Step A is a step of recognizing information terminals on the packet-switched network.

Step B is a step of notifying the recognized information terminals of an incoming call when an incoming call is received from the circuit-switched network.

Step C is a step of connecting to the circuit-switched network the information terminal that has responded first to the incoming call notification.

BRIEF DESCRIPTION OF THE DRAWINGS

FIG. 7 is a diagram showing a conceptual configuration of a client management table that holds statuses of information terminals;

FIG. 8 is a diagram showing a conceptual configuration of a client management table that holds source telephone numbers;

FIG. 9 is a diagram showing a conceptual configuration of a client management table that holds destination telephone numbers;

FIG. 11 is a diagram showing a conceptual configuration of a client management table at which a telephone message recorder terminal is registered;

FIG. 12 is a diagram showing another exemplary conceptual configuration of a client management table at which a telephone message recorder terminal is registered;

DETAILED DESCRIPTION OF PREFERRED EMBODIMENTS

The present invention will now be described in detail with reference to the drawings.

A first embodiment is described first below.

Figure 1:
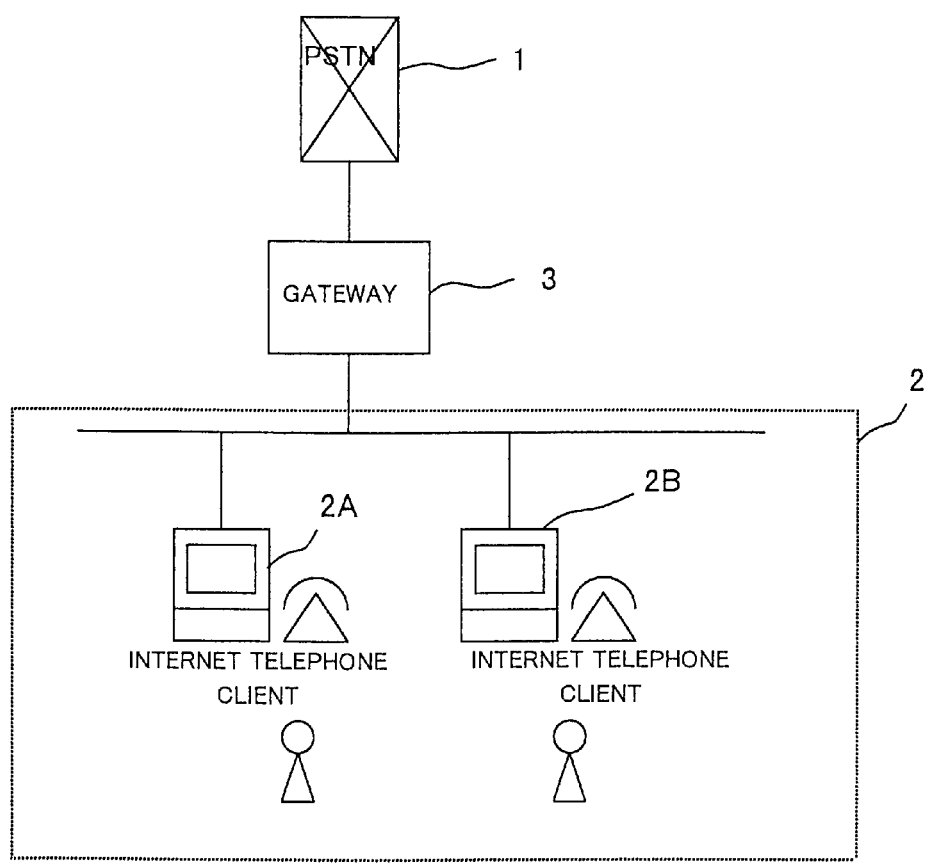
FIG. 1 is a diagram showing an exemplary configuration of equipment using a gateway of the present invention.

FIG. 1 shows a configuration of equipment in which a public switched telephone network 1 or PSTN 1 (a circuit-switched network) is connected to a local area network 2 or LAN 2 (a packet-switched network) using a gateway apparatus 3 in accordance with a first embodiment of the present invention. A plurality of information terminals 2A, 2B, etc. are connected to the LAN 2. It should be understood that only two terminals 2A and 2B are depicted, but several more such terminals may be connected thereto.

Figures 2, 3:
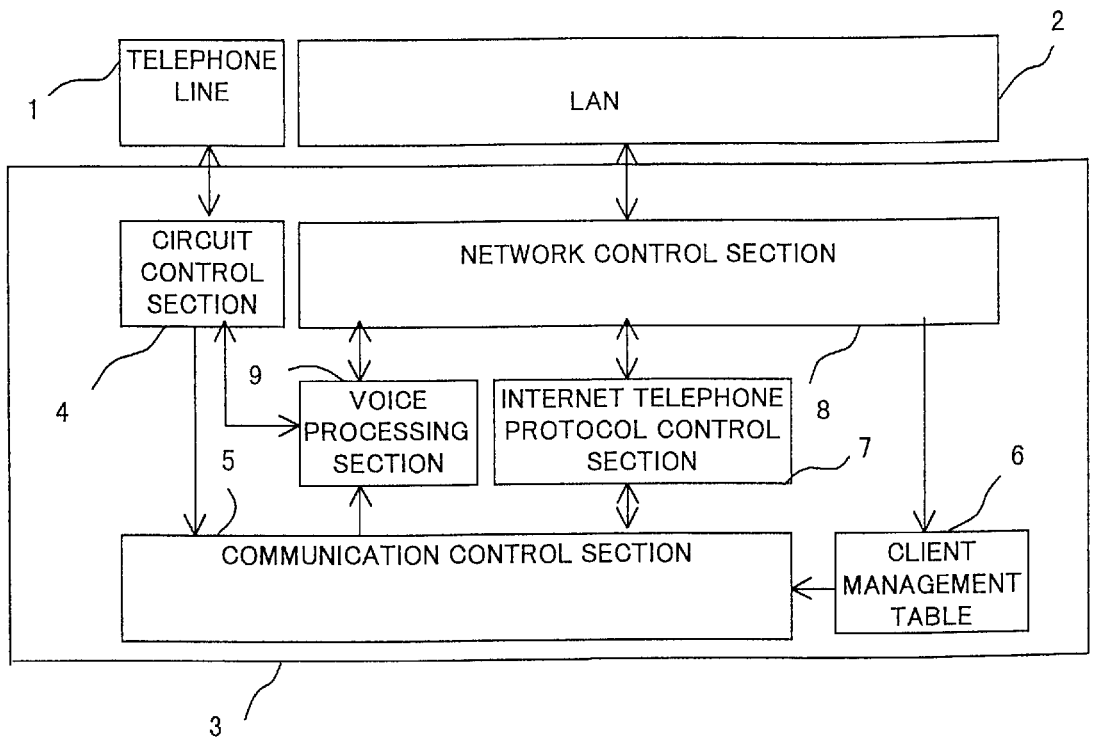
FIG. 2 is a functional block diagram of a gateway according to a first embodiment of the present invention.
FIG. 3 is a diagram showing a conceptual configuration of a client management table.

FIG. 2 is a block diagram showing functions of the gateway 3 shown in FIG. 1. The gateway 3 has a circuit control section 4, a communication control section 5, a client management table 6, an Internet telephone protocol control section 7, a network control section 8 and a voice processing section 9.

First, the client management table 6 will be described. The client management table 6 registers registration numbers of the information terminals on the LAN 2, the names of clients and IP addresses. The gateway 3 recognizes the information terminals registered at the client management table 6 and notifies them accordingly of an incoming communication. An exemplary conceptual structure of the client management table 6 is shown in FIG. 3.

The circuit control section 4 supports communication protocols corresponding to the types of lines belonging to the PSTN 1, and accepts communications (i.e., telephone calls) from the PSTN 1. Further, when receiving a communication or call from the PSTN 1, the circuit control section 4 sends an incoming call signal to the communication control section 5. Furthermore, the circuit control section 4 allows voice streams to be transmitted and received between the PSTN 1 and the voice processing section 9 in accordance with instructions from the communication control section 5.

Figure 4:
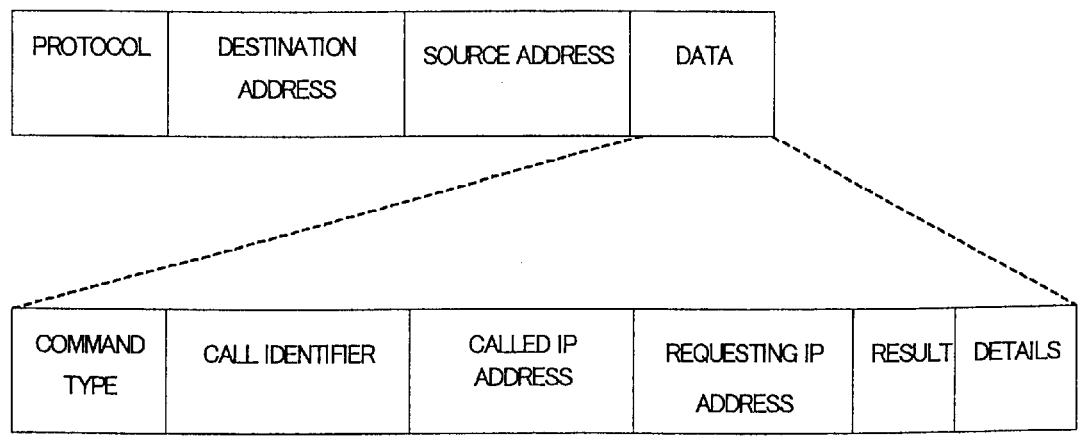
FIG. 4 is a diagram showing a conceptual configuration of a packet.

FIG. 4 shows a conceptual configuration of a packet set up by the circuit control section 4. A packet consists of protocol (control information), a destination address, a source address (calling IP address) and data. Among this information and data, the control information, the destination address and the source address are attached to one another as the data section is transmitted and received through the PSTN 1. The above pieces of information are needed for communication procedures.

The data section is a portion of data in which to be transmitted and received, and consists of a command type, a call identifier, a called IP address, a requesting IP address, a result and details. An information terminal-calling command is set to the "command type." The following three commands are used in the instant embodiment: "SET UP" corresponding to a call-requesting message; "CONNECT" corresponding to a connection message; and "UNDO" corresponding to a disconnection message. The "call identifier" is used to allow the "SET UP," "UNDO" and "CONNECT" commands to correspond to one another. For example, when the call identifier of the "SET UP" command is "0001," the call identifier of the "CONNECT" command is "0001."

The IP address of an information terminal to which a call is destined is identified in the "called IP address." The IP address of the gateway is set to the "requesting IP address." The "result" is used to indicate that, when a command is, e.g., "CONNECT," the "CONNECT" command can or cannot be accommodated. The "details" indicate detailed information about the "result" such as an error code.

The communication control section is described below.

When receiving an incoming call signal from the circuit control section 4, the communication control section 5 sends a call-requesting message to all the information terminals registered at the client management table 6 through the Internet telephone protocol control section 7 and the LAN 2. When a connection message is received from one of the information terminals, the section 5 causes the Internet telephone protocol control section 7 to connect to the information terminal that responded first to the notification, and allows voice streams to be transmitted and received between the voice processing section 9 and the connected information terminal. The communication control section 5 transmits a disconnection message to the other information terminals that were not the first to transmit a connection message.

The Internet telephone protocol control section is described below.

The Internet telephone protocol control section 7 receives the call-requesting message and the disconnection message from the communication control section 5, and notifies the network control section 8 to that effect. Further, the section 7 receives a connection message from the LAN 2 and notifies the communication control section 5 to that effect.

The network control section 8 transmits and receives data between the gateway 3 and the LAN 2, e.g., by allowing voice streams to be received and delivered between the voice processing section 9 and the LAN 2 and allowing a call-requesting message and a connection message to be received and delivered between the Internet control protocol control section 7 and the LAN 2.

The voice processing section 9 performs the operation of transforming a voice stream received from the PSTN 1 into packets (packetizing) and transmitting the packetized voice stream to the LAN 2. The voice processing section 9 also performs the operation of transforming a packet received from the LAN 2 into a voice stream and transmitting the prepared voice stream to the PSTN 1 between the circuit control section 4 and the network control section 8.

The operation of the present invention is as follows.

Figure 5:
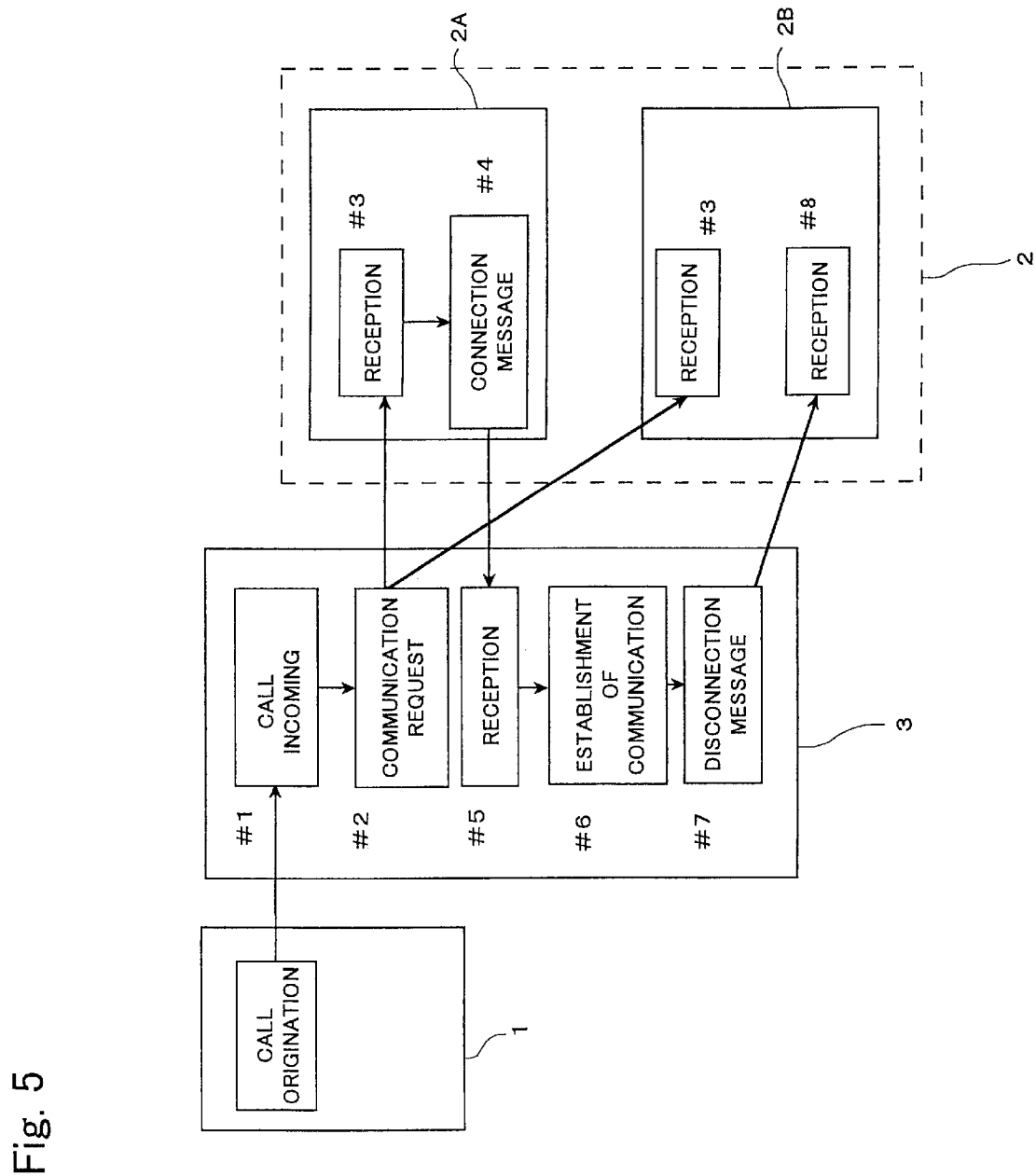
FIG. 5 is a diagram explaining a flow of a connection process performed by the gateway.

FIG. 5 is a diagram explaining a process by which the gateway 3 having the aforementioned functions establishes the connection between the PSTN 1 and the LAN 2.

When the gateway receives an incoming call from the PSTN 1 through the circuit control section 4 (#1), the communication control section 5 transmits an communication requesting message to all the information terminals, such as the terminals 2A and 2B, registered in the client management table 6 and notifies each information terminal of the call (#2).

Any one of the information terminals that have received the communication requesting message from the gateway 3 (#3) may return a connection message to the gateway 3 (#4), for instance, the information terminal 2A.

When the gateway 3 has received the connection message (#5), the gateway 3 allows transmission and reception of voice streams to be started between the voice processing section 9 and the information terminal 2A that has returned a connection message (#6). Then, the gateway 3 transmits a disconnection message to the other information terminals, such as the information terminal 2B (#7).

The other information terminals, such as the information terminal 2B, that has received the disconnection message, recognize that the connection has been established to an other information terminal (#8).

A second embodiment of the present invention is described below.

While an incoming call notification is sent to all the information terminals registered at the client management table 6 in the first embodiment, an incoming call notification may be sent to a plurality of information terminals in a point-to-multipoint communication manner by setting a broadcast address or multi-cast address to the "destination address" of a packet so that information terminals can be specified using the broadcast address or multi-cast address.

Specifically, when a broadcast address such as 10.254.211.255 is specified as the "destination address," the communication control section 5 sends an incoming call notification to all the information terminals belonging to the LAN 2 in a point-to-multipoint communication manner. When a multi-cast address such as 244.0.0.2 is specified, the communication control section 5 sends an incoming call notification in a point-to-multi point communication manner to a plurality of information terminals that are registered as "Group Identification=2" among the IP addresses of the LAN 2.

In this case also, transmission and reception of voice streams is started between the voice processing section 9 and the first information terminal that returns a connection message of the information terminals that have received the incoming call notification. If none of the specified information terminals transmits a connection message, the communication control section 5 may transmit an incoming call notification to other information terminals, and similarly establish the connection with an information terminal that has responded first.

Further, if the PSTN 1 uses an ISDN line, a sub-address that is transmitted at the time of an incoming call can be used. In this case, sub-addresses are allotted to each of the information terminals listed in the client management table 6. For example, if a sub-address is the aforementioned broadcast address, the communication control section 5 transmits an incoming call notification to all the information terminals belonging to the LAN 2 in a point-to-multipoint communication manner. If a sub-address has no destination-specifying information or does not coincide with the client management table 6, the communication control section 5 sends a communication requesting-requesting message to the information terminals using any one of the aforementioned techniques.

A third embodiment is described below.

An incoming call notification may be sent to information terminals registered at the client management table 6 in an appropriate order. For example, the order is counted from an initial value 000001 in accordance with the "No." specified in the client management table 6 shown in FIG. 3, and whenever an incoming call is received, the communication control section 5 first transmits an incoming call notification to an information terminal whose IP address is 123.456.789.001 that is designated to take a call first.

If the information terminal that is designated to receive a call transmits a connection message (indicating the call is being received by that terminal), the communication control section 5 starts transmission and reception of voice streams between that information terminal and the voice processing section 9, and increments the count of order to 000002 so that this terminal is no longer designated as the first terminal to receive an incoming call. If a next terminal is absent, the count of order is reset to the initial value. If, on the other hand, the information terminal that is designated to receive the call fails to transmit a connection message, the next information terminal indicated by the count the "No." column in FIG. 3 is notified. The information terminal having to take its turn notifies other information terminals of the incoming call successively in the specified order until a response is received, and the connection is established with an information terminal that has responded to the incoming call notification. The absence of a response is determined by the fact that there is no response within an appropriate time interval or that a disconnection message is received from an information terminal.

A fourth embodiment of the present invention is described below.

Figure 6:
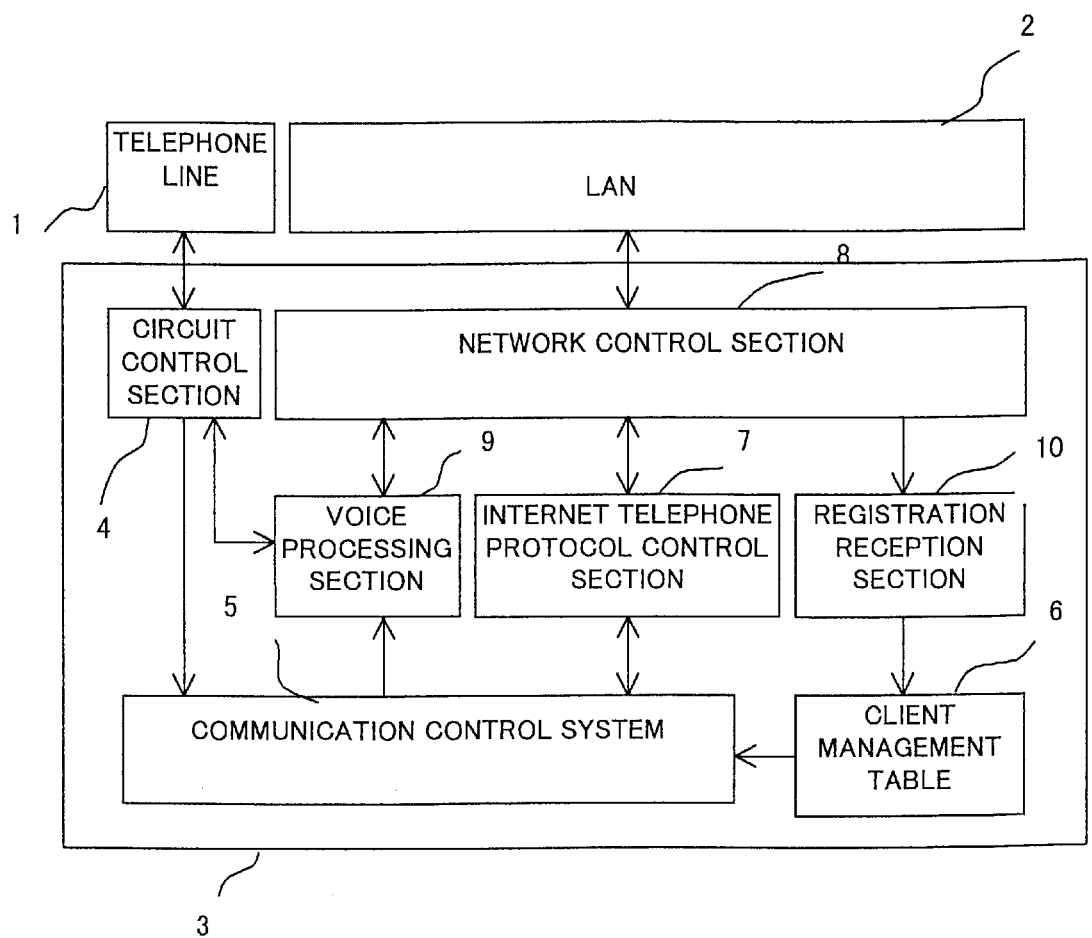
FIG. 6 is a functional block diagram of a gateway according to a fourth embodiment.

FIG. 6 is a functional block diagram showing a gateway in accordance with a fourth embodiment of the present invention. The gateway 3 according to this embodiment has all of the features described above with respect to the first, second and third embodiments, but also includes a registration reception section 10. This embodiment uses additional commands to the aforementioned three types of commands as specified in the "command type" portion of the data section of a packet. The additional commands are "AVAIL- ABLE" and "UNAVAILABLE" that correspond to an incoming call-available message and an incoming call-unavailable message, respectively.

The registration reception section 10 receives through the LAN 2 an incoming call-available message from an information terminal ready to receive an incoming call. The incoming call-available message includes the name of a client (at an information terminal) and an IP address. The registration reception section 10 writes, into the client management table 6, the name of the client and the IP address included in the received incoming call-available message.

The registration reception section 10 also receives an incoming call-unavailable message from an information terminal through the LAN 2. The incoming call-unavailable message includes terminal-specifying information such as the name of a client. When receiving an incoming call-unavailable message, the registration reception section 10 deletes the information regarding the concerned information terminal from the client management table 6.

That is, the registration reception section 10 operates to allow the client management table 6 to hold information about only those information terminals that can accept an incoming call. Further, it may be so arranged that the status of each information terminal is specified in the client management table 6 and that the incoming call status of each information terminal is updated every time an incoming call-available message or an incoming call-unavailable message is received. FIG. 7 shows a conceptual diagram of the client management table 6 in this case.

The operation of this embodiment is similar to that of the first embodiment except that the client management table 6 registers information terminals that are available to accept incoming calls. Therefore, when the gateway 3 receives an incoming call from the PSTN 1, the gateway transmits an incoming call notification to an information terminal and allows transmission and reception of voice data to be started between the voice processing section 9 and an information terminal that has returned a connection message using techniques similar to those of the first to third embodiments.

A fifth embodiment of the present invention is described below.

The gateway 3 in a fifth embodiment is generally the same as the gateway of the fourth embodiment except that additionally it allows the client management table 6 to hold source telephone numbers in such a manner that the source telephone numbers correspond to specific information terminals, respectively. When the gateway 3 receives an incoming call from the PSTN 1, the gateway 3 obtains a source telephone number notified from the PSTN 1 at the time the call is first received, searches the client management table 6 to select an information terminal based on the obtained source telephone number, and sends a communication requesting message to the selected information terminal.

The correspondence between an information terminal and a source telephone number may be implemented by causing the registration reception section 10 to allot source telephone numbers to the information terminals. The allotment may be effected by considering communication records in the past, or the like. FIG. 8 is a conceptual diagram of the client management table 6 in which source telephone numbers "06*" and "03*" are allotted to and held for client names "Fujitsu01" and "Fujitsu02." The telephone number "06*" indicates an arbitrary source telephone number that starts with 06.

When receiving an incoming call from the PSTN 1, the circuit control section 4 sends an incoming call signal to the communication control section 5. At this time, the circuit control section 4 obtains a source telephone number if such telephone number is transmitted from the PSTN 1, and notifies the communication control section 5 of the obtained telephone number together with the incoming call.

The communication control section 5 checks the notified source telephone number with the source telephone numbers listed in the client management table 6 and specifies an information terminal. Then, the communication control section 5 sends a communication requesting message to the specified information terminal. If the source telephone number from the PSTN 1 does not coincide with any one of the source telephone numbers listed in the client management table 6, the communication control section 5 sends a communication requesting message to the information terminals in any one of the techniques described with reference to the first to fourth embodiments. When receiving a connection message from an information terminal, the communication control section 5 causes the Internet telephone protocol control section 7 to connect such information terminal similarly to the above, and further allows voice streams to be transmitted and received between the voice processing section 9 and the client. The source telephone number from the PSTN may be received in a variety of methods. For instance, the source telephone number may be transmitted from a telephone from which the incoming call originates or may be provided by the PSTN.

A sixth embodiment of the present invention is described below.

A gateway apparatus according to a sixth embodiment is generally the same as the gateway apparatus of the fourth embodiment except that it further includes a plurality of lines (destination telephone numbers) on the PSTN 1 and allows the client management table 6 to allot any one of such plurality of lines to specified information terminals. When the gateway 3 receives an incoming call from the PSTN 1, the gateway 3 selects an information terminal allotted to a line to which the incoming call is directed (destination telephone number) from the information terminals listed in the client management table 6, and sends a communication requesting message to the selected information terminal.

The correspondence between an information terminal and a destination telephone number may be implemented by causing the registration reception section 10 to allot destination telephone numbers to the information terminals listed in the client management table 6. The user may allot destination telephone numbers by considering which terminal receives an incoming call from which line at a higher frequency. A conceptual diagram of the client management table 6 shown in FIG. 9 is an example in which destination telephone numbers "012-345-1000" and "012-345-2000" are allotted to client names "Fujitsu01" and "Fujitsu02."

When receiving an incoming call directed to any one of the lines (destination telephone numbers) from the PSTN 1, the circuit control section 4 sends an incoming call signal to the communication control section 5. At the time of the notification, the section 4 also notifies the section 5 of the destination telephone number.

When receiving the incoming call signal from the circuit control section 4, the communication control section 5 searches the client management table 6 to select an information terminal that is allotted to the notified destination telephone number, and sends a communication requesting message to the selected information terminal.

A seventh embodiment of the present invention is described below.

Figure 10:
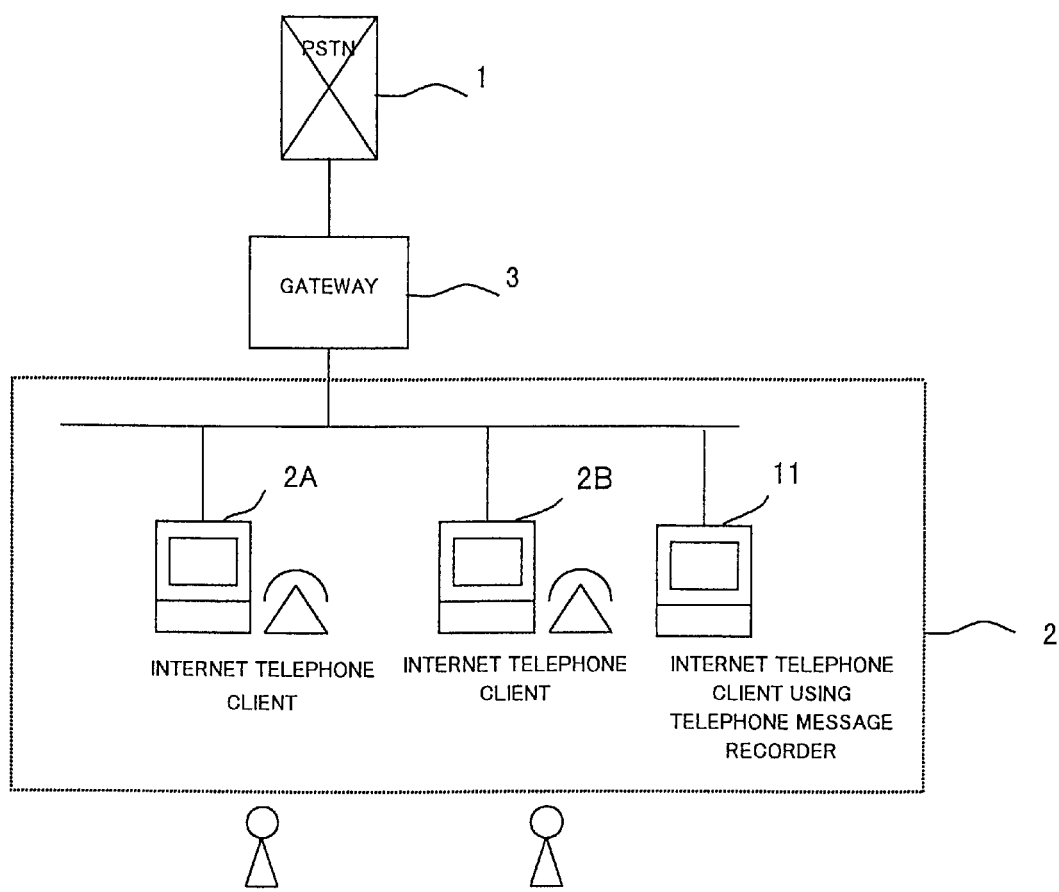
FIG. 10 is a diagram showing a configuration of equipment using a gateway according to a seventh embodiment.

In a seventh embodiment, a telephone message recorder terminal 11 is connected to the LAN 2. FIG. 10 shows an exemplary configuration of equipment of a gateway system having the telephone message recorder terminal 11. It should be noted that a functional block diagram of the gateway 3 shown in FIG. 10 is similar to that of the fourth embodiment.

As far as the gateway 3 is concerned, the telephone message recorder terminal 11 is one of the information terminal except that the terminal 11 stands ready to be connected to the PSTN 1 at all times and saves received communications in voice files, or the like, as recorded telephone messages. That is, when the telephone message recorder terminal 11 receives an incoming call request from the gateway 3, the terminal 11 returns a connection message to the gateway 3. When the gateway 3 has connected the terminal 11 to the PSTN 1, the terminal 11 transmits and receives voice streams to and from the PSTN 1 through the voice processing section 9. The recorded messages saved in the telephone message recorder terminal 11 may be retrieved later by a person.

Further, if there is information that can specify an information terminal for receiving a source telephone number, a destination telephone number, an IP address and the like, such information may also be recorded in the telephone message recorder, and when each information terminal registers itself at the client management table 6, each information terminal may make inquiries to the telephone message recorder terminal 11 for the information. Furthermore, the telephone message recorder terminal 11 may notify each information terminal of the information via an e-mail.

The telephone message recorder terminal 11 is registered at the client management table 6 in advance. It may be preferred that a special number, such as "No. 000000" as shown in FIG. 11, be given to the telephone message recorder terminal 11 so that the terminal 11 can be identified accordingly. As shown in FIG. 7, when the incoming call status of each information terminal is held in the client management table 6, the status of the telephone message recorder terminal 11 is always "AVAILABLE".

When receiving an incoming call signal from the circuit control section 4, the communication control section 5 selects the telephone message recorder terminal 11 as the destination of a communication requesting message if there is no information terminal that is registered at the client management table 6 as shown in FIG. 11 or if there is no incoming call-available information terminal as shown in FIG. 12. Or the communication control section 5 transmits an incoming call message to the telephone message recorder terminal 11 when the section 5 has transmitted an incoming call notification to the information terminals other than the telephone message recorder terminal 11 and has received no response from any one of such information terminals. When the communication control section 5 receives a connection message from the telephone message recorder terminal 11, the section 5 connects the telephone message recorder terminal 11 to the PSTN 1 through the Internet telephone protocol control section 7, and allows voice streams to be transmitted and received between the voice processing section 9 and the telephone message recorder terminal 11 similarly to other information terminals.

An eighth embodiment of the present invention is described below.

Figure 13:
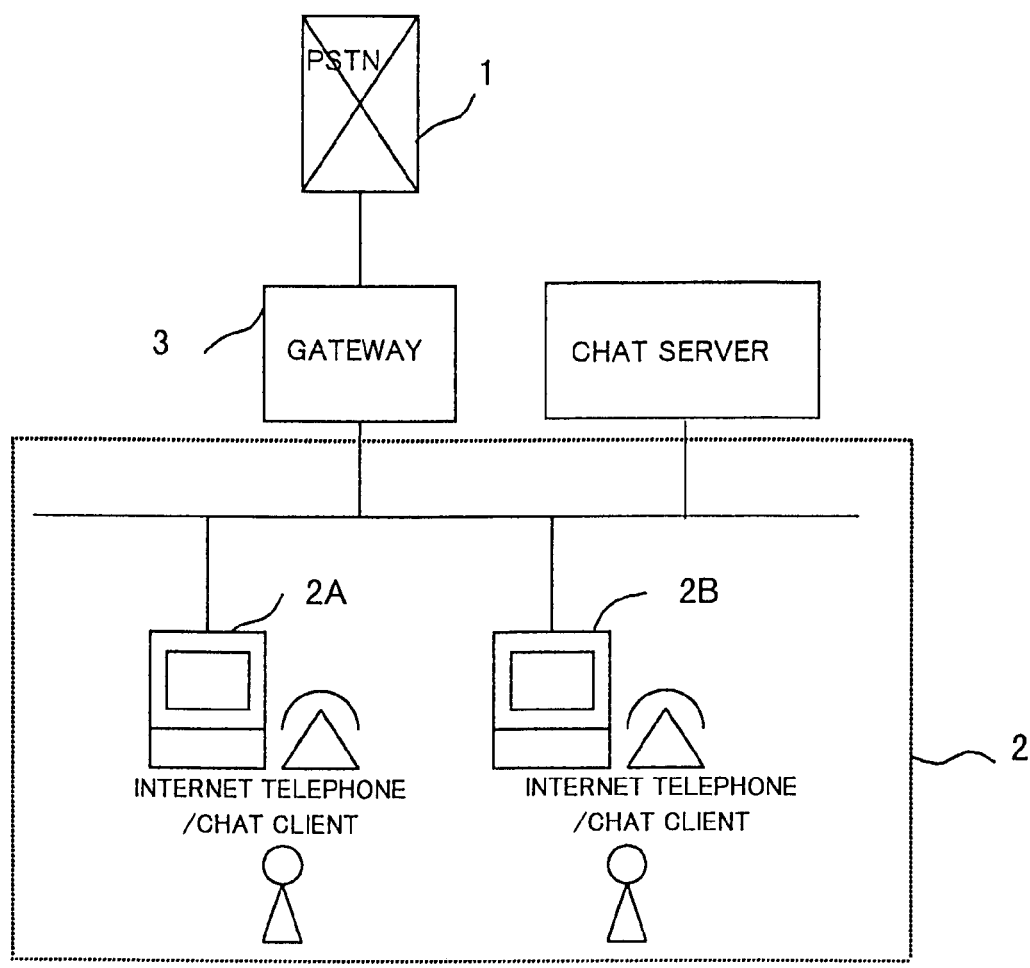
FIG. 13 is a diagram showing a configuration of equipment using a gateway according to an eighth embodiment.
Figure 14:
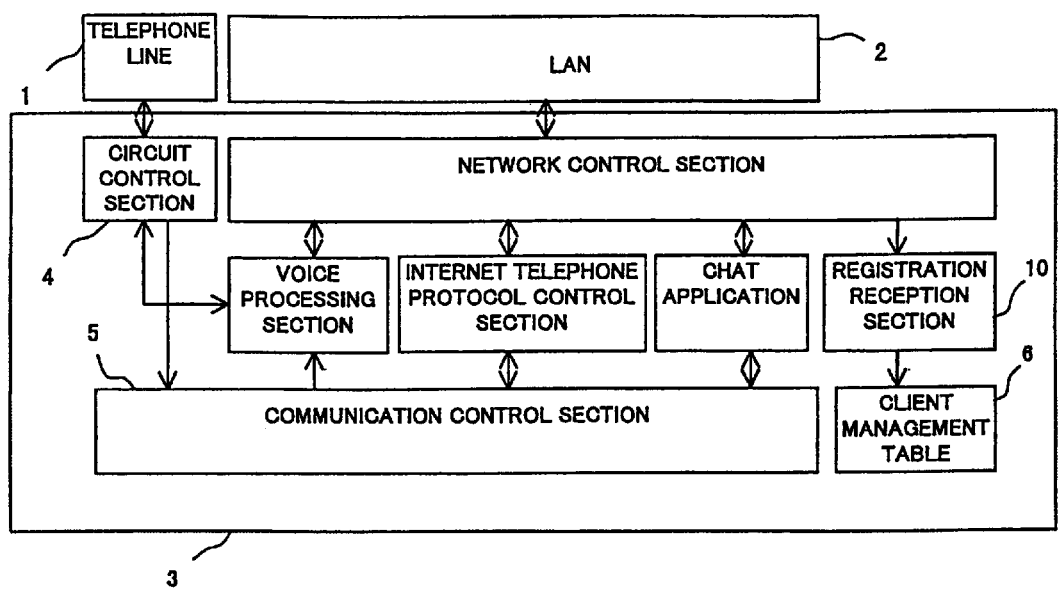
FIG. 14 is a functional block diagram of a gateway capable of executing a chat application.

In an eighth embodiment, the gateway 3 and the information terminals 2A and 2B (and others not shown) on the LAN 2 can execute a chat application. FIG. 13 shows a configuration of equipment that allows a chat application to be executed, and FIG. 14 is a functional block diagram of the gateway. The functional block diagram of FIG. 14 is the same as that of the fourth embodiment shown in FIG. 6 except that a chat application 12 is additionally provided. In this embodiment, the information terminals on the LAN 2 enter a chat channel when preparations for a call have been made, and stand ready to receive an incoming call notification from the gateway 3.

The circuit control section 4 supports communication protocols corresponding to the types of lines on the PSTN 1 similarly to the above, and sends an incoming call signal to the communication control section 5 upon reception of an incoming call from the PSTN 1. During this operation, the circuit control section 4 sends to the section 5 information such as a source telephone number and a destination telephone number if the section 4 can obtained such information, as described above.

When receiving the incoming call signal from the circuit control section 4, the communication control section 5 chats through a command that indicates incoming call notification, e.g., "SET UP" on the chat application 12. In this instance, the communication control section 5 checks if the incoming call signal includes user-specifying information such as a source telephone number and a destination telephone number, and chats through such information if such information is included.

In addition, the communication control section 5 checks to see if a connection message is sent during the chat on the same channel. For example, the communication control section 5 detects a command that indicates a specific chat made through a connection message including an IP address, e.g., "CONNECT." Then, the communication control section 5 causes the Internet telephone protocol control section 7 to connect an information terminal that has the above IP address, and allows voice streams to be transmitted and received between the voice processing section 9 and the client, similarly to the above. If a plurality of information terminals have returned a connection message, the communication control section 5 connects an information terminal that has returned a connection message first similarly to the first embodiment, and transmits a disconnection message to the other information terminals similarly to the above.

In the case where the telephone message recorder terminal 11 is used, the communication control section 5 connects the telephone message recorder terminal 11 similarly to the above if none of the information terminals other than the recorder terminal 11 chats through a connection message, and communications are saved in the telephone message recorder.

It should be noted that the gateway of the present invention can be implemented by appropriately combining the techniques described with reference to the first through eighth embodiments.

Some of the effects of the invention are described below.

The use of the present invention facilitates connection from an ordinary PSTN to an information terminal that is connected to a packet-switched network such as Internet or Intranet, and hence makes it easy to set up a call center and a pilot telephone using an Internet telephone.

What is claimed is:

1. A gateway apparatus that connects a packet-switched network to a circuit-switched network, the packet-switched network having a plurality of information terminals connected thereto, comprising:

recognition means for storing identifiers of the information terminals on the packet-switched network and the addresses of the information terminals on the packet-switched network;

incoming call notification means for notifying each of the information terminals having the identifiers stored in said recognition means of an incoming call when receiving the incoming call from the circuit-switched network;

connection means for connecting to the circuit-switched network the information terminal that has responded first to the incoming call notification; and sending means for sending a disconnection message to each of the information terminals that have responded to the incoming call notification except for the information terminal that has connected to the circuit-switched network.

2. The gateway apparatus according to claim 1, wherein said incoming call notification means notifies each of the information terminals on the packet-switched network of the incoming call in a point-to-multipoint communication using a broadcast address when receiving the incoming call from the circuit-switched network.

3. The gateway apparatus according to claim 1, wherein said incoming call notification means notifies a plurality of the information terminals on the packet-switched network of the incoming call in a point-to multipoint communication using a multi-cast address when receiving the incoming call from the circuit-switched network.

4. The gateway apparatus according to claim 1, wherein:

said recognition means allocates an order to each of the information terminals; and said incoming call notification means notifies each of the information terminals of the incoming call in accordance with the order that has been allocated thereto when receiving the incoming call from the circuit-switched network, and repeats the incoming call notification to each information terminal in turn until a response to the incoming call notification is received.

5. The gateway apparatus according to claim 1, wherein:

said recognition means allocates source identifying information of the circuit-switched network to selected ones of the information terminals having the identifiers stored in said recognition means; and said communication notification means selects an information terminal corresponding to the source-identifying information and notifies a selected information terminal of the incoming call when receiving the incoming call accompanying the source-identifying information from the circuit-switched network.

6. The gateway apparatus according to claim 1, wherein:

the gateway apparatus supports a plurality of lines on the circuit-switched network;

said recognition means allots any one of the plurality of lines to each of the information terminals having the identifiers stored in said recognition means; and when receiving the incoming call directed to one of the plurality of lines from the circuit-switched network, said incoming call notification means selects the information terminal allotted to the line to which the incoming call is directed and notifies the selected information terminal of the incoming call.

7. The gateway apparatus according to claim 1, wherein:

the information terminals and said gateway apparatus can handle character communication with each other by using an application executing character communications substantially on a real-time basis;

said incoming call notification means notifies the information terminals having the identifiers stored in said recognition means of the incoming call by character communication when receiving the incoming call from the circuit-switched network; and said connection means connects to the circuit-switched network the information terminal that has responded first to the incoming call notification by said character communication.

8. The gateway apparatus according to claim 1, wherein:

at least one of the information terminals is a telephone message recorder terminal having communication recording means and being always available to receive incoming calls; and said connection means connects the telephone message recorder terminal to the circuit-switched network if there is no response from any of the information terminals to which the incoming call notification has been sent.

9. The gateway apparatus according to claim 1, wherein said recognition means recognizes incoming-call-available information terminals.

10. The gateway apparatus according to claim 1, wherein:

said recognition means maintains an incoming call status of the recognized information terminals; and said incoming call notification means notifies the information terminals whose incoming call status is incoming-call-available of the incoming call.

11. A terminal specification method used for a gateway apparatus that connects a packet-switched network to a circuit-switched network, the packet-switched network having a plurality of information terminals connected thereto, the method comprising:

storing identifiers of the information terminals on the packet-switched network and addresses of the information terminals on the packet-switched network;

notifying information terminals having the stored identifiers of an incoming call when the incoming call is received from the circuit-switched network;

connecting to the circuit-switched network the information terminal that has responded first to the incoming call notification;

sending a disconnection message to each of the information terminals that have responded to the notifying of the information terminals except for the information terminal that has connected to the circuit-switched network; and transmitting the incoming call between the circuit-switched network and the information terminal through the gateway apparatus.

12. The terminal specification method according to claim 11, wherein said notifying of the information terminals on the packet-switched network of the incoming call is by a point-to-multipoint communication using a broadcast address when receiving the incoming call from the circuit-switched network.

13. The terminal specification method according to claim 11, wherein said notifying of a plurality of the information terminals on the packet-switched network of the incoming call is by a point-to multipoint communication using a multi-cast address when receiving the incoming call from the circuit-switched network.

14. The terminal specification method according to claim 11, wherein:

said storing further includes allocating an order to each of the information terminals; and said notifying notifies each of the information terminals of the incoming call in accordance with the order that has been allocated thereto when receiving the incoming call from the circuit-switched network, and repeats the incoming call notification to each information terminal in turn until a response to the incoming call notification is received.

15. A computer-readable recording medium having recorded a terminal-specifying program used for a gateway that connects a packet-switched network to a circuit-switched network, the packet-switched network having a plurality of information terminals connected thereto, the recording medium having recorded the terminal-specifying program for executing:

storing identifiers of the information terminals on the packet-switched network and addresses of the information terminals on the packet-switched network;

notifying information terminals having stored identifiers of an incoming call when the incoming call is received from the circuit-switched network;

connecting to the circuit-switched network the information terminal that has responded first to the incoming call notification;

sending a disconnection message to each of the information terminals that have responded to the notifying of the information terminals except for the information terminal that has connected to the circuit-switched network; and transmitting the incoming call between the circuit-switched network and the information terminal through the gateway apparatus.

16. A gateway apparatus that connects a packet-switched network to a circuit-switched network, the packet-switched network having a plurality of information terminals connected thereto, comprising:

recognition means for storing identifiers of the information terminals on the packet-switched network and the addresses of the information terminals on the packet-switched network;

incoming call notification means for notifying each of the information terminals having the identifiers stored in said recognition means of an incoming call when receiving the incoming call from the circuit-switched network;

connection means for connecting to the circuit-switched network the information terminal that has responded first to the incoming call notification such that the incoming call is transmitted between the circuit-switched network and the information terminal through the gateway apparatus; and sending means for sending a disconnection message to each of the information terminals that have responded to the incoming call notification except for the information terminal that has connected to the circuit-switched network.

17. A terminal specification method used for a gateway apparatus that connects a packet-switched network to a circuit-switched network, the packet-switched network having a plurality of information terminals connected thereto, the method comprising:

storing identifiers of the information terminals on the packet-switched network and addresses of the information terminals on the packet-switched network;

notifying information terminals having the stored identifiers of an incoming call when the incoming call is received from the circuit-switched network;

connecting to the circuit-switched network the information terminal that has responded first to the incoming call notification;

sending a disconnection message to each of the information terminals that have responded to the incoming call notification except for the information terminal that has connected to the circuit-switched network; and transmitting the incoming call between the circuit-switched network and the information terminal through the gateway apparatus.

18. A computer-readable recording medium having recorded a terminal-specifying program used for a gateway that connects a packet-switched network to a circuit-switched network, the packet-switched network having a plurality of information terminals connected thereto, the recording medium having recorded the terminal-specifying program for executing:

storing identifiers of the information terminals on the packet-switched network and addresses of the information terminals on the packet-switched network;

notifying information terminals having stored identifiers of an incoming call when the incoming call is received from the circuit-switched network;

connecting to the circuit-switched network the information terminal that has responded first to the incoming call notification;

sending a disconnection message to each of the information terminals that have responded to the incoming call notification except for the information terminal that has connected to the circuit-switched network; and transmitting the incoming call between the circuit-switched network and the information terminal through the gateway apparatus.

19. A gateway apparatus that connects a packet-switched network to a circuit-switched network, the packet-switched network having a plurality of information terminals connected thereto, comprising:

a recognition unit storing identifiers of the information terminals and addresses of the information terminals;

an incoming call notification unit notifying each of the information terminals having the identifiers stored in the recognition unit of an incoming call when receiving the incoming call from the circuit-switched network;

a connection unit connecting to the circuit-switched network the information terminal that has responded first to the incoming call notification such that the incoming call is transmitted between the circuit-switched network and the information terminal through the gateway apparatus; and a disconnection sending unit to send a disconnection message to each of the information terminals that have responded to the incoming call notification except for the information terminal that has connected to the circuit-switched network.

20. A gateway apparatus having a recognition unit, the gateway apparatus connecting a packet-switched network to a circuit-switched network, the packet-switched network having a plurality of information terminals connected thereto, the recognition unit storing identifiers corresponding to the information terminals and addresses of the information terminals on the packet-switched network, comprising:

an incoming call notification unit notifying each of the information terminals having the identifiers stored in the recognition unit of an incoming call received from the circuit-switched network;

a connection unit connecting the circuit-switched network and one information terminal that is first to respond to the incoming call notification such that the incoming call is transmitted between the circuit-switched network and the one information terminal through the gateway apparatus; and a disconnection sending unit to send a disconnection message to each of the information terminals that have responded to the incoming call notification except for the information terminal that has connected to the circuit-switched network.

21. A method of connecting a packet-switched network to a circuit-switched network, the packet-switched network having a plurality of information terminals connected thereto, comprising:

storing identifiers and addresses of each of the information terminals;

notifying the information terminals having the stored identifiers of an incoming call from the circuit-switched network;

connecting to the circuit-switched network one information terminal that is first to respond to said notifying;

sending a disconnection message to each of the information terminals that have responded to the incoming call notification except for the information terminal that has connected to the circuit-switched network; and transmitting the incoming call between the circuit-switched network and the one information terminal through the gateway apparatus.

* * * * *